United States Patent [19]

Meyer-Rudolphi et al.

[11] Patent Number: 4,820,412
[45] Date of Patent: Apr. 11, 1989

[54] ELEMENT FOR THE TRANSFER OF GAS INTO LIQUIDS, IN PARTICULAR, FOR THE TRANSFER OF OXYGEN IN SEWAGE TREATMENT PLANTS

[76] Inventors: Karl U. Meyer-Rudolphi, Am Nonnensee 12, 7180 Crailsheim; Alexander Herle, Schemppstrasse 36, 7000 Stuttgart 75, both of Fed. Rep. of Germany

[21] Appl. No.: 14,982

[22] Filed: Feb. 17, 1987

[30] Foreign Application Priority Data

Feb. 18, 1986 [DE] Fed. Rep. of Germany ....... 3605024

[51] Int. Cl.$^4$ .............................................. C02F 3/20
[52] U.S. Cl. .................................. 210/220; 261/122; 261/DIG. 70
[58] Field of Search .............................. 210/220, 170; 261/121.1, 122-124, DIG. 70

[56] References Cited

U.S. PATENT DOCUMENTS

| | | | |
|---|---|---|---|
| 3,153,682 | 10/1964 | Walker | 261/DIG. 70 |
| 3,802,676 | 4/1974 | Thayer | 261/DIG. 70 |
| 3,954,922 | 5/1976 | Walker et al. | 261/DIG. 70 |
| 4,428,893 | 1/1984 | Cummings, Jr. et al. | 261/122 |
| 4,557,879 | 12/1985 | Weber | 261/122 |
| 4,622,139 | 11/1986 | Brown | 210/220 |
| 4,629,591 | 12/1986 | Forsyth | 261/122 |

FOREIGN PATENT DOCUMENTS

| | | |
|---|---|---|
| 1029754 | 5/1958 | Fed. Rep. of Germany . |
| 7816785 | 9/1978 | Fed. Rep. of Germany . |
| 3141666 | 5/1983 | Fed. Rep. of Germany . |
| 8436007 | 4/1985 | Fed. Rep. of Germany . |

Primary Examiner—Benoit Castel
Attorney, Agent, or Firm—Lorusso & Loud

[57] ABSTRACT

To increase the efficiency of the gas transfer in an element for the transfer of gas into liquids, in particular, for the transfer of oxygen in sewage treatment plants, with a porous gas transfer member into which gas is introduced via a feeder line and after passage through a porous gas transfer member is given off in the form of gas bubbles into the liquid surrounding the gas transfer member, it is proposed that the gas transfer member be in the form of a circular-cylindrical pipe consisting of porous material which is closed at both end faces by an end section made of porous material, and that the pipe be horizontally and sealingly positioned on a gas feeder line which opens into the pipe on the lower side of the pipe halfway between the two end faces.

8 Claims, 1 Drawing Sheet

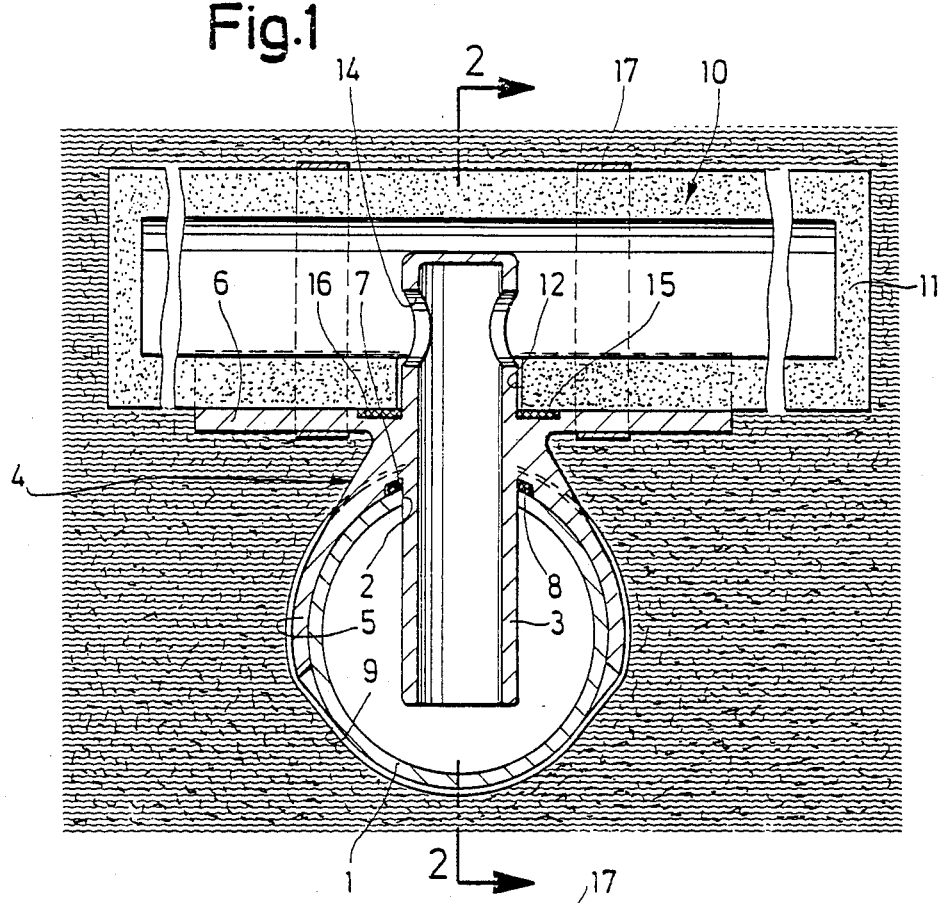
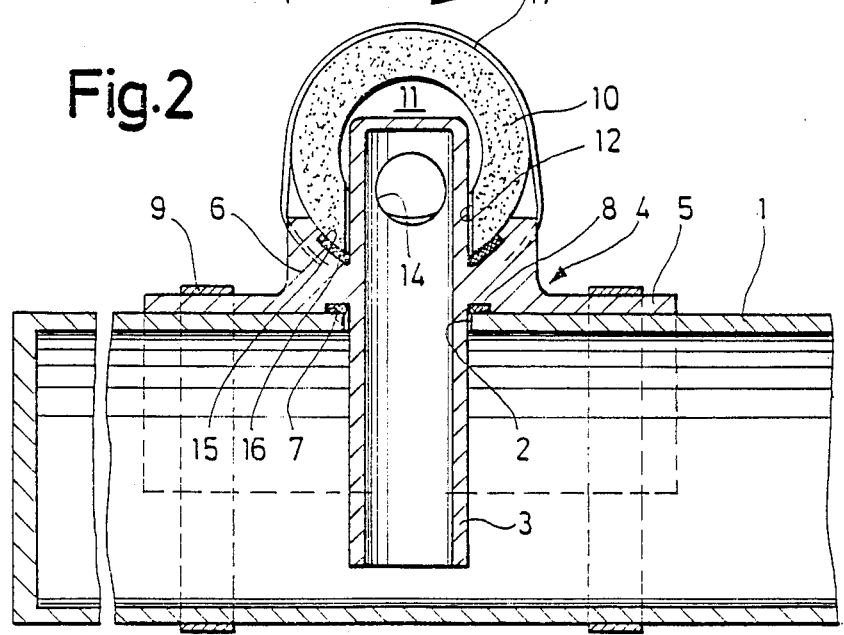

ELEMENT FOR THE TRANSFER OF GAS INTO LIQUIDS, IN PARTICULAR, FOR THE TRANSFER OF OXYGEN IN SEWAGE TREATMENT PLANTS

BACKGROUND OF THE INVENTION

The invention relates to an element for the transfer of gas into liquids, in particular, for the transfer of oxygen in sewage treatment plants, with a porous gas transfer member into which gas is introduced via a feeder line and after passage through the porous gas transfer member is given off in the form of gas bubbles into the liquid surrounding the gas transfer member.

Such gas transfer elements are, for example, of plate-like or disk-shaped configuration, with the gas bubbles mainly exiting from the upper boundary surface of the gas transfer member. It has been found that the exiting bubbles are subject to a constriction as they rise, i.e., the bubbles exiting from the total surface are compressed during their ascent onto a cross section which is substanitally smaller than the cross section of the surface of the platelike gas transfer member. In this way, a number of bubbles come into contact with one another and form considerably larger bubbles (bubble cluster) which results in a substantial reduction in the available diffusion surface of the bubbles, which is of prime importance in the transfer of the gas into the liquid. This clearly decreases the efficiency of the transfer of the gas into the surrounding liquid, which is extremely disadvantageous, particularly in the field of sewage treatment where atmospheric oxygen should be introduced as efficiently as possible into the liquid to be purified.

The construction for installing pipe aeration systems in sewage treatment plants has hitherto involved a great deal of expenditure for both the aids and the assembly (stub supply lines, four-edged distributors, seals, etc.). Also, such constructions are subject to particularly strong corroding influences, which led to the use of expensive high-grade steel pages and devices.

SUMMARY OF THE INVENTION

The object of the invention is to so improve a gas transfer element of the generic kind that intensive contact is established between the gas bubbles and the surrounding liquid over a larger area of contact in order to achieve a particularly efficient transfer of the gas. This object is attained in a gas transfer element of the kind described at the outset, in accordance with the invention, by the gas transfer member being in the form of a circular-cylindrical pipe made of porous material which is closed at both end faces by an end section made of porous material, and by the pipe being horizontally and sealingly positioned on a gas feeder line which runs into the pipe on the lower side of the pipe halfway between the two end faces.

With such a tubular, horizontally arranged gas transfer member consisting of porous material and having end faces similarly closed with porous material, the gas introduced from the supply line exits via a considerable part of the surface and also the porous end faces and due to the tubular geometry of the gas transfer member a substantially smaller constriction occurs than with the large level surface of a dome-type aerator. In this way, the rising gas bubbles interact with a much larger area of liquid.

A further advantage is that if the surface of the gas transfer element should become soiled by sinking solids, further surface areas at the side of the tubular gas transfer member and even on its lower side start to function and the gas bubbles then exit through these into the surrounding liquid. In contrast with gas transfer members having a horizontal, level gas transfer surface, soiling on the upper side of the gas transfer member does not have an adverse effect.

It is particularly advantageous for the pore width of the porous material of the pipe and the end section to be identical.

With a system of this kind, several tubular gas transfer members can be positioned on a common, horizontally extending supply line and connected to its interior via a gas feeder line, in each case, and the longitudinal axes of the tubular gas transfer members can extend at an angle to the longitudinal direction of the supply line. Such an installation enables large areas of a settling tank to be uniformly supplied with gas.

In a particularly preferred embodiment, a gas feeder line section with an upwardly open shell-type carrier for accommodation of the tubular gas transfer member and with a downwardly open shell-type support oriented at an angle thereto is placed for support on the supply line, in order to sealingly position the tubular gas transfer member on the supply line, and the gas feeder line section is in sealed communication with the interior of the gas transfer member and of the supply line, respectively, through openings in the tubular gas transfer member and the supply line. Such a configuration of a gas feeder line section with a shell-type carrier and a shell-type support enables a particularly simple and effective mechanical and fluidic connection of the gas transfer member with the supply line.

Protrusion of the feeder line section into the interior of the gas transfer member and/or the interior of the supply line is highly advantageous for mutual fixing. In the gas transfer member, this feeder line section ensures continuous water removal during the gas transfer procedure.

The surface of the shell-type carrier may be contiguous to that of the tubular gas transfer member and/or the surface of the shell-type support to that of the supply line. Tightening means may be provided to press together the shell-type carrier and the gas transfer member, and the shell-type support and the supply line, respectively. These are preferably tightening straps which surround the shell-type carrier and the gas transfer member, and the shell-type support and the supply line, respectively. This enables particularly simple assembly of the gas transfer members on the supply line since the shell-type support need only be positioned on a supply line provided with an opening on the upper side such that the gas feeder line section sinks into the supply line. In addition, the tubular gas transfer member is placed on the shell-type carrier at an angle to the longitudinal direction of the supply line and the gas feeder line section sinks into the interior of the tubular gas transfer member. These parts are secured relative to one another by tightening straps being placed around the shell-type carrier and the gas transfer member, and the supply line and the shell-type support, respectively, and tightened.

It is expedient to arrange on the inner sides of the shell-type carrier and/or the shell-type support, annular seals which surround the gas feeder line section and closely abut the outer side of the gas transfer member and the supply line, respectively. The gas flow path is automatically made tight by such annular seals when the system is tightened.

It is particularly advantageous for the gas feeder line section, the shell-type carrier and the shell-type support to be of integral construction.

BRIEF DESCRIPTION OF THE DRAWINGS

The following description of a preferred embodiment serves in conjunction with the drawings to explain the invention in greater detail. In the drawings:

FIG. 1 is a longitudinal sectional view through a gas transfer member positioned on a supply line; and FIG. 2 is a sectional view taken on line 2—2 in FIG. 1.

DESCRIPTON OF THE PREFERRED EMBODIMENT

The system illustrated in the drawings is suitable for installation at the bottom of a settling tank of a sewage treatment plant, but, in principle, such a system could also be used in other installations where a gas is to be introduced into a liquid in the form of gas bubbles.

Connected or unconnected supply lines 1 communicating with a gas supply are laid in several parallel rows at the bottom of the settling tank. The drawing shows only one supply line 1 which is illustrated without its anchorage at the bottom of the settling tank.

This supply line comprises on its upper side at a certain spacing an opening 2 through which the lower end of a vertically extending gas feeder line section 3 is inserted so that this gas feeder line section 3 terminates in the interior of the supply line 1.

The gas feeder line section 3 is part of an integrally constructed connector 4 which in addition to the vertical gas feeder line section 3 includes a downwardly open shell-type support 5 of approximately semicircular cross section and a horizontal, upwardly open shell-type carrier 6 extending transversely thereto. The shell-type support 5 and the shell-type carrier 6 are so arranged that the gas feeder line section 3 protrudes at the center of the two shell-type members into the cavity enclosed by these, with the shell-type support 5 and the shell-type carrier 6 being joined together by the material surrounding the gas feeder line section 3.

The inner surface of the shell-type support 5 is adapted to the outer contour of the supply line 1 so that the inner surface of the shell-type support 5 is contiguous to the outer surface of the supply line 1 (FIG. 1). An annular groove 7 surrounding the gas feeder line section 3 on the inner side of the shell-type support 5 accommodates an annular seal 8 which sealingly encloses the opening 2 in the supply line 1.

The connector 4 is fixed in its position relative to the supply line 1 by tightening straps 9 being laid around the shell-type support 5 and the supply line 1 and tightened in a manner known per se. The sealing between the connector 4 and the supply line 1 with the aid of the annular seal 8 is effected simultaneously with this tightening.

Inserted into the shell-type carrier 6 is a tubular gas transfer member 10 of circular cross section which is closed at each of the two end faces by an end section 11. The end section 11 may be of level construction, but a semispherical configuration is also particularly expedient. The wall of the gas transfer member and the end section consist in like manner of a porous material which is permeable to gas. The pore size is, for example, of the order of magnitude of between 80 and 500 μm.

The material of this pipe may, for example, be sand of different grain sizes which is bonded by a plastic binder, for example, by Bakelite resin. The cylindrical jacket and the end section are of integral construction. The length of the gas transfer member may, for example, lie between 250 and 1,500 mm.

On the underside, the gas transfer member comprises an opening 12 through which the upper end of the gas feeder line section 3 protrudes into the interior of the tubular gas transfer member 10. The gas feeder line section 3 comprises lateral openings 14 oriented approximately in the direction of the longitudinal axis of the gas transfer member 10.

The inner surface of the shell-type carrier 6 is adapted to the outer contour of the tubular gas transfer member 10 so that the surfaces of the gas transfer member and the shell-type carrier 6 are contiguous. Similarly to the shell-type support 5, the shell-type carrier 6 comprises an annular groove 15 surrounding the gas feeder line section 3 with an annular seal 16 arranged therein. The gas transfer member is also attached to the shell-type carrier 6 in the same way as the shell-type support 5 to the supply line 1, i.e., by means of tightening straps 17 which surround the shell-type carrier 6 and the gas transfer member 10 and are tightened in a manner known per se.

In comparison with known installations, use of the one-piece connector 4 simplifies assembly of the gas transfer members on the supply line to a considerable extent since it is sufficient to place the connector 4 onto the supply line provided with an opening on the upper side and to position the tubular gas transfer member 10 on it at an angle so that the gas feeder line section 3 protrudes through the opening on the underside of the gas transfer member into the latter. Assembly is completed by putting on and tightening the tightening straps 9 and 17.

There is no need for any special alterations to be made to the supply line or the gas transfer members. In particular, it is extremely simple to exchange gas transfer members as the tightening bands need only be released and the old gas transfer member removed and replaced by a new one which is then tightened in the conventional manner. There is no necessity at all for any structural changes. The bores 2 required in the supply line 1 may also be made after the lines have been laid.

What is claimed is:

1. A gas transfer element for the transfer of gas into liquids, in particular, for the transfer of oxygen into sewage treatment plants, with a porous gas transfer member into which gas is introduced via a feeder line and after passage through the porous gas transfer member is given off in the form of gas bubbles into the liquid surrounding the gas transfer member, comprising: at least one gas tranfer member which is in the form of a circular-cylindrical pipe made of porous material which is closed at both faces by an end section wherein the pipe is sealingly positioned on a common supply line and connected with its interior via a gas feeder line and in that the longitudinal axis of the least one tubular gas member extends at an angle to the longitudinal direction of the supply line wherein the sealingly position of the at least one tubular gas transfer member on the supply line includes a gas feeder line section with an upwardly open shell-type carrier for accommodation of the at least one tubular gas transfer member and a downwardly open shell-type support on the supply line wherein the gas feeder line section is in sealed communication with the interior the at least one gas-transfer member and of the supply line, respectively, through openings in the at least one tubular gas transfer member and the supply line.

2. Gas transfer element as defined in claim 1 wherein the gas feeder line section protrudes into the interior of the gas transfer member and/or the interior of the supply line.

3. Gas transfer element as defined in claim 1 wherein a first surface of the shell-type carrier is contiguous to that of the tubular gas transfer member and/or a second surface of the shell-type support is contiguous to that of the supply line, and in that tightening means are provided to press together the shell-type carrier and the gas transfer member, and the shell-type support and the supply line, respectively.

4. Gas transfer element as defined in claim 3 wherein the tightening means are tightening straps which surround the shell-type carrier and the gas transfer member, and the shell-type support and the supply line, respectively.

5. Gas transfer element as defined in claim 1 wherein there are arranged on the inner sides of the shell-type carrier and/or of the shell-type support, annular seals which surround the gas feeder line section and sealingly abut the outer side of the gas transfer member and of the supply line, respectively.

6. Gas transfer mmember as defined in claim 1 wherein the gas feeder line section, the shell-type carrier and the shell-type support are of integral construction.

7. Gas transfer element as defined in claim 1 wherein the end sections are made of porous material.

8. Gas transfer element as defined in claim 11 wherein the pore width of the porous material of the pipe and the end sections is identical.

* * * * *